W. K. BRADFORD.
SELF ADJUSTING CASTER.
APPLICATION FILED JAN. 3, 1921.
1,373,648. Patented Apr. 5, 1921.
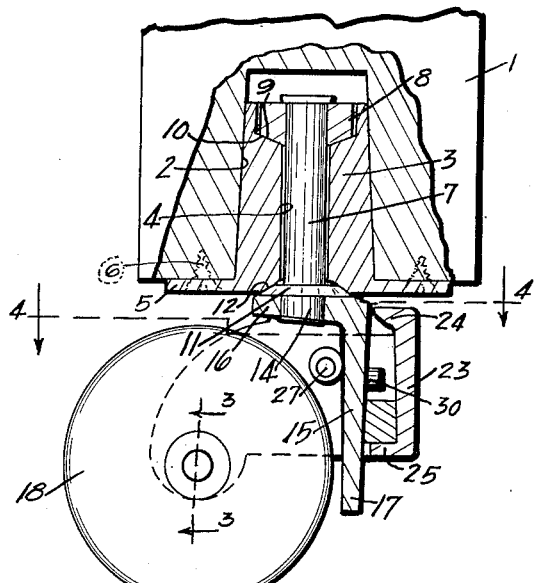
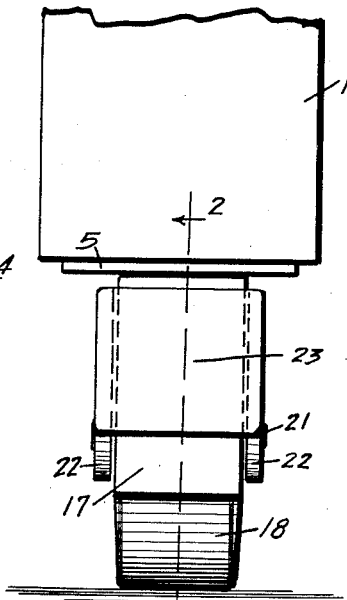
Fig. 2. Fig. 1.
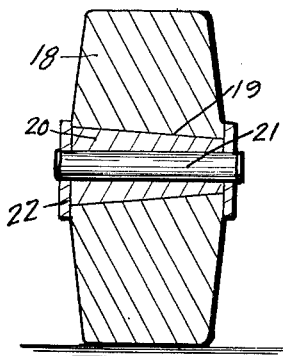
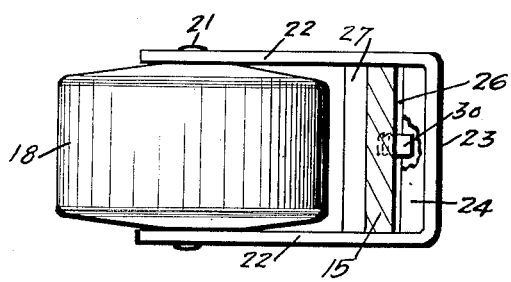
Fig. 3. Fig. 4.
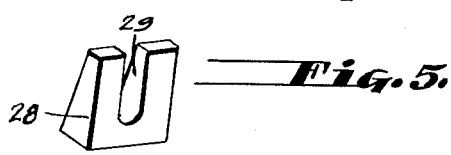
Fig. 5.
Wallace K. Bradford
INVENTOR.
BY Hazard & Miller
ATTORNEY.

ically adjust itself downwardly with relation to the leg or other support in which it is mounted in order to compensate for depressions in the surface over which the caster moves.

UNITED STATES PATENT OFFICE.

WALLACE K. BRADFORD, OF LOS ANGELES, CALIFORNIA.

SELF-ADJUSTING CASTER.

1,373,648.

Specification of Letters Patent.

Patented Apr. 5, 1921.

Application filed January 3, 1921. Serial No. 434,627.

*To all whom it may concern:*

Be it known that I, WALLACE K. BRADFORD, a citizen of the United States, residing at Los Angeles, in the county of Los Angeles and State of California, have invented new and useful Improvements in Self-Adjusting Casters, of which the following is a specification.

It is the object of this invention to provide a caster which will automatically adjust itself downwardly with relation to the leg or other support in which it is mounted in order to compensate for depressions in the surface over which the caster moves.

It is a further object of the invention to provide self locking means for a caster of this character and to also provide a bearing for the caster which will compensate for wear, and thereby prevent flattening of the bearing.

The invention will be readily understood from the following description of the accompanying drawings, in which:

Figure 1 is an end elevation of a caster constructed in accordance with the invention and mounted upon a suitable support such as a table leg.

Fig. 2 is a side elevation of the caster and leg partly in vertical section on the line 2—2 of Fig. 1.

Fig. 3 is a vertical section through the roller of the caster taken on the line 3—3 of Fig. 2.

Fig. 4 is a horizontal section on the line 4—4 of Fig. 2.

Fig. 5 is a detail perspective view of the locking wedge employed in the caster construction.

In the drawings, I have illustrated a usual support 1 which may be a table leg or the like, and which is provided at its lower end with a tapering axial bore 2. A bushing 3 having the bearing bore 4 is received in this tapering bore, and is held in position by an annular flange 5 at its outer end received against the end of the table leg and secured thereto as by screws 6.

The pintle 7 of the caster is journaled in bearing bore 4, and at its upper end a collar 8 is riveted to the pintle and is provided with a beveled lower surface 9 received against a coöperating beveled surface 10 at the end of bushing 3. The lower end of the pintle has a collar 11 formed integral therewith, and provided with a beveled surface 12 received within a coöperating beveled counter bore 4. Beyond collar 11 the pintle terminates in an angularly disposed extension 14. By the construction as thus set forth, it will be seen that the pintle of the caster is readily rotatable in bushing 3 and with relation to the table leg.

An angle plate 15 is connected to the projecting end 14 of the pintle 7, said angle plate including an arm 16 suitably mounted upon the projecting end of the pintle and resting against collar 11, and a depending downwardly tapering arm 17 arranged at right angles to arm 16, and as a consequence disposed at a slight angle to the axis of pintle 7.

The roller of the caster is shown at 18 provided with a tapering axial bearing 19 in which is received a tapering bushing 20 fixed to an axial pintle 21 extending through the roller and mounted in side plates 22 of a supporting frame for the roller. By this arrangement the roller is rotatable upon the tapering bushing, so as to compensate for wear and prevent distortion of the bearing for the roller.

The supporting frame for the roller is a substantially U-shaped member comprising the side arms 22 and the end plate 23. The upper and lower ends of end plate 23 terminate in inwardly extending lips 24 and 25 respectively, and said lips are so arranged as to form a space 26 between the same and the roller 18 through which the arm 17 of the angle plate connected to pintle 7 is adapted to be received.

An eccentric pintle 27 is mounted between the side plates 22, so as to abut against the upper end of arm 17, and thereby force the same toward lip 24, the parts being so arranged that when in this position a slight space is left between arm 17 and the lip. A wedge 28 is received against the opposite side of arm 17 in the space between the arm and the end plate 23, the wedge being provided with a vertical slot 29 in which is received a pin 30 upon arm 17. This pin moving in slot 29 permits of vertical adjustment of the roller and its supporting frame relative to the angle plate carried by the pintle of the caster, but the abutment of said pin against the base of slot 29 and against lip 24 at its respective limits of movement will prevent separation of the roller and its frame from the angle plate and the pintle.

When the roller of the caster is resting upon a surface and the weight of the table is upon leg 1, the supporting frame of the roller will tend to rotate with relation to the angle plate so as to bind the parts by the abutment of pintle 27 against the depending arm of the angle plate, and as a consequence, the roller and its supporting frame are locked against vertical adjustment relative to the table leg. When however, the caster upon one of the legs of a table moves over a depression in a surface, the roller of the caster and its supporting frame are free to swing downwardly with relation to the angle plate so that the pintle 27 moves away from the depending arm of the angle plate. This movement is limited by the abutment of lip 24 against the angle plate. When the parts are thus moved, the supporting frame of the roller is released from the angle plate and may be freely moved downwardly relative to the same until roller 18 again engages the surface when the parts will again be locked against relative adjustment as previously described. In order to adjust the roller of the caster upwardly with relation to the table leg, it is only necessary to lift the leg sufficiently to move the weight therefrom, so that the supporting frame of the roller is again free for vertical adjustment relative to the angle plate, and said frame and roller may then be readily adjusted along the depending arm of the angle plate and automatically locked in adjusted position by again allowing the weight of the table to rest upon the leg.

Various changes may be made without departing from the spirit of the invention as claimed.

What is claimed is:

1. In a caster the combination of a frame for a roller, and a supporting plate received through the same and automatically locked in adjusted positions relative to the frame.

2. In a caster the combination of a frame for a roller, and a supporting plate received through the same and adapted to be twisted by the weight supported so as to bind said plate relative to the frame.

3. In a caster the combination of a frame for a roller, and a supporting plate received through the same and adapted to be twisted by the weight supported so as to bind said plate relative to the frame, said plate when the weight is released being readily shiftable through said frame.

4. In a caster the combination of a frame for a roller, and a supporting plate received through the same and automatically locked in adjusted positions relative to the frame, and means for limiting the adjustment of said plate relative to said frame.

5. In a caster the combination of a frame having a tapering bearing member and a roller having a coöperating tapering bore received thereon.

6. In a caster the combination of a frame for a roller, and a supporting plate received through the same and arranged for lateral twist relative to said frame, said frame having a pintle adapted to abut against said plate when twisted to bind the parts.

7. In a caster the combination of a frame for a roller, and a supporting plate received through the same and arranged for lateral twist relative to said frame, said frame having a pintle adapted to abut against one face of said plate and a wedge received between the opposite face of said plate and said frame so as to bind the parts when twisted.

8. In a caster the combination of a frame for a roller, and a supporting plate received through the same and arranged for lateral twist relative to said frame, said frame having a pintle adapted to abut against one face of said plate and a wedge received between the opposite face of said plate and said frame so as to bind the parts when twisted, and a pin projecting from said plate and received in a slot of said wedge to prevent displacement of the parts.

In testimony whereof I have signed my name to this specification.

WALLACE K. BRADFORD.